Nov. 26, 1963 F. F. WARR ETAL 3,112,122
TRANSPORTING APPARATUS
Filed June 13, 1961 2 Sheets-Sheet 1
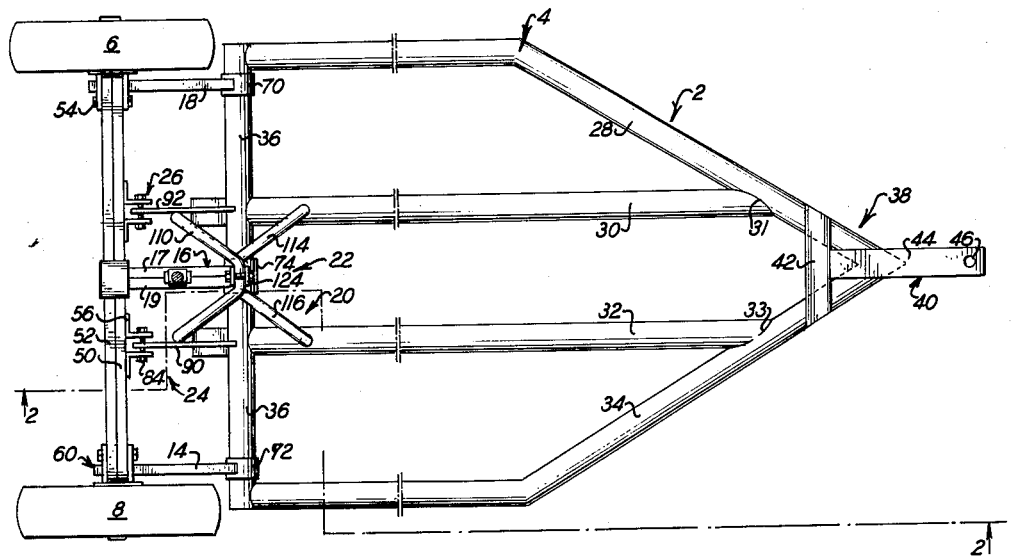
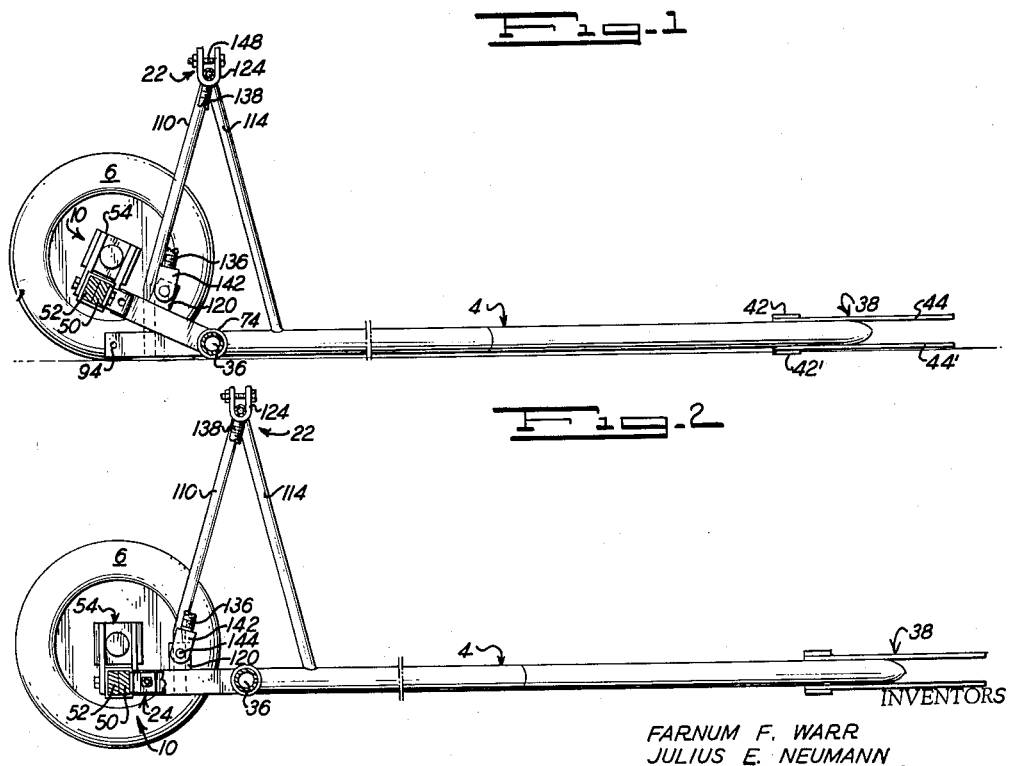
INVENTORS
FARNUM F. WARR
JULIUS E. NEUMANN
BY
ATTORNEYS Nov. 26, 1963  F. F. WARR ETAL  3,112,122
TRANSPORTING APPARATUS
Filed June 13, 1961  2 Sheets-Sheet 2

INVENTORS
FARNUM F. WARR
JULIUS E. NEUMANN

BY Jacoki & Jacoki
ATTORNEYS 3,112,122
Patented Nov. 26, 1963

3,112,122
TRANSPORTING APPARATUS
Farnum F. Warr and Julius E. Neumann,
Murtaugh, Idaho
Filed June 13, 1961, Ser. No. 116,757
3 Claims. (Cl. 280—43.2)

This invention relates to apparatus for transporting cumbersome devices, and more particularly to apparatus readily usable for transporting farm implements, such as harrows.

Various types of trailers, wagons, and the like have heretofore been suggested for ultization in transporting machinery adapted for use on the farm. Some devices have even been provided which allegedly are particularly suited for use in carrying or moving harrows from place to place. Notwithstanding the prior suggestions, however, there remains a great need on the farm for an apparatus which can be readily used to quickly transfer harrows and other types of cumbersome farm implements from place to place.

Accordingly, one of the primary objects of the present invention is to provide an improved transport apparatus which will conveniently handle cumbersome farm items, such as harrows, and permit ready movement thereof from place to place.

Yet a further primary object of the present invention is to provide such a device or apparatus incorporating a movable platform means and simple mechanical expedients for lowering the platform means to loading position whereby implements can be placed thereon by pulling the implements over such platform means.

Still further, yet more specific objects of the present invention are: (a) to provide a transporting apparatus conforming with all of the preceding objects and comprising a wheeled frame and a platform means so coupled together that the platform means can be lowered to the ground upon tilting of the wheeled frame; (b) to provide such a transporting apparatus which further includes a mechanical jack carried by the platform means and cooperating with the frame means whereby the platform means can be raised or lowered with respect to the ground by operation of the mechanical jack; (c) to provide such a transporting device wherein the mechanical jack is of the "ratchet operated turn-buckle type;" (d) to provide such an apparatus wherein the platform means is provided with projecting bars, and the frame means is provided with brackets adapted to receive the bars, and wherein the bars and brackets are provided with registering apertures through which a locking pin is adapted to pass to maintain the platform means in a fixed horizontal position relative to the frame means whereby the apparatus can, when in such position, be hooked to a tractor or the like and pulled at high speeds over roadways or fields without danger of disassembly; (e) to provide such an apparatus wherein the frame means and jack incorporated therein are disposed at the rear of the platform means, and wherein the forward end of the platform means is so arranged and assembled that it can be conveniently connected with a tractor hydraulic lift or drawbar so as to be raised to a traveling position thereby; (f) to provide an apparatus conforming with all of the preceding objects which can be readily manufactured from existing components, which is trouble-free in operation, and which is durable in use; and (g) to provide such an apparatus which can be inexpensively fabricated so as to be available to the average farmer or other user thereof.

The invention lies in the combination, construction, and arrangement of the various means and elements incorporated therein as explained in more detail below.

The invention will be better understood, and objects other than those specifically set forth above will become apparent, when consideration is given to the following detailed description. Such description refers to the annexed drawings presenting the preferred and illustrative embodiments of the invention, and wherein:

FIGURE 1 is a condensed plan view of an overall apparatus constructed in accordance with the present invention;

FIGURE 2 is a side view, partially in section, taken on the line 2—2 of FIGURE 1, and presenting the relative disposition of the components of the apparatus shown in FIGURE 1 when such components are disposed in position for a loading operation;

FIGURE 3 is a side view like FIGURE 2, taken on the line 2—2 of FIGURE 1, but FIGURE 3 presents the relative disposition of the components when the same are disposed in position for a transporting operation;

Figure 4:
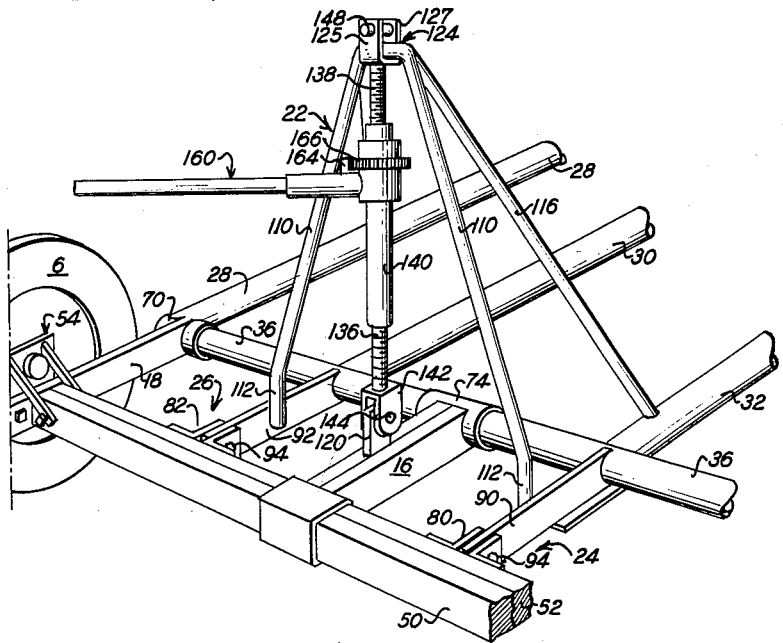
Figure 5:
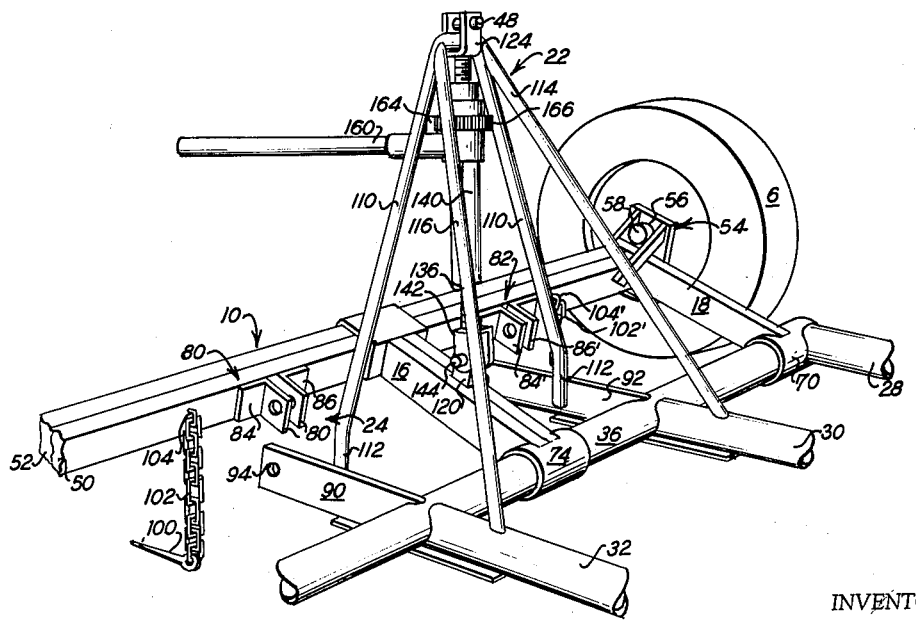

FIGURE 4 is a fragmental perspective view of one end section of the apparatus shown in FIGURE 1, FIGURE 4 presenting the components thereof as the same would appear when the assembly is in "traveling" position; and FIGURE 5 is a fragmental elevational view, similar to FIGURE 4, but taken from the reverse side, and showing the components in the positions which they would occupy when the assembly is in "loading" position.

In FIGURE 1, the overall apparatus provided by the invention is generally designated by the numeral 2, and is shown as comprising a platform means generally designated by the numeral 4, a pair of ground engaging wheels 6 and 8, frame means generally designated by the numeral 10 and defining an axle supported between the wheels 6 and 8, coupling means including the arms 14, 16, and 18 fixed to the frame means and pivotally cooperating with the platform means, an upstanding support means generally designated by the numeral 20, a mechanical jack generally designated by the numeral 22 as best shown in FIGURE 4, and releasable attaching elements 24 and 26 which serve as cooperating means carried by the platform means and the frame means for releasably fixing the platform means in a given position relative to the frame means.

The platform means 4 includes a plurality of elongated rods 28, 30, 32, and 34 which are fixed at one end to a crossbar 36 extending across the back of the platform means 4, as shown. Preferably the outside pipes or bars of the platform means 4, namely bars 28 and 34 are bent inwardly at their forward end to converge and form a generally V-shape platform forward end 38 as shown in FIGURE 1. The intermediate bars or pipes 30 and 32 have their forward ends fixed to the V-shape end 38 as at 31 and 33 by means of welding. It will be understood that while four bars are shown as forming the elongate platform means, as many bars as desired may be used.

Coupled to end 38 of the platform is an attaching device 40 comprising a pair of crossbars 42, 42' and a pair of tongues 44, 44'. The tongues 44, 44' project beyond the forward end 38 of the platform means and are provided with suitable apertures 46 so that the tongues can be coupled with an element extending from the hydraulic lift or drawbar of the tractor whereby the platform can be directly linked thereto. More specifically, the tongues are so arranged that they will receive between them a coupling eye, whereby a pin can be passed through apertures 46 and the eye to positively couple the transporting device 2 to a tractor or the like.

The frame means 10 extending between the ground engaging wheels 6 and 8 preferably comprises a pair of elongate bars 50 and 52 which are welded or otherwise joined together to form a rectangular axle. Coupled to one end of the bars 50 and 52 is a bracket 54 which, as shown in FIGURE 5, is provided with an aperture 56 adapted to receive the axle 58 extending from wheel 6. Similarly, the opposite end of the axle comprising bars 50 and 52 carries a bracket 60 identical with the bracket 54.

Disposed intermediate the ends of the frame means and carried on bar 50 thereof, are a plurality of coupling arms 14, 16, and 18. These arms extend forward of bars 50 and 52 in the direction of the rear end of the platform means. The arms 14 and 18 each include a bar welded, or otherwise suitably attached at one end to the ends of the axle 10, and carrying at the opposite end, i.e. the ends adjacent the rear of the platform means 4, collars 70 and 72 through which the bar 36 forming the rear end of the platform means 4 is adapted to rotatably pass. The arm 16 carried centrally of the frame means, and projecting forwardly thereof, comprises a pair of bars 17 and 19 welded together and to bars 50 and 52. Arm 16 includes collar 74 carried at the forward end thereof. The collar 74, like the collars 70 and 72, is adapted to rotatably surround the rear bar 36 of the platform means 4.

By virtue of the coupling between the frame means and the rear end of the platform means through the arms 14, 16 and 18 and collars 70, 72 and 74, the platform means can be lowered and pivotally moved relative to the frame means. Specific reference should be made to FIGURE 2 wherein the platform means 4 is shown as lowered to the ground, and wherein the frame means 10 is shown as tilted forwardly toward the ground. The cooperation between the collars and rear bar 36 of the platform means permits the simultaneous tilting of the frame means and lowering of the platform means. The traveling position or horizontal position of the same components, is shown in FIGURE 3, and by referring to that figure, it will be noted that the platform means is in horizontal alignment with the frame means 10.

To provide for safe operation during travel of the apparatus over the roadway or the like, there is provided, as suggested, the means 24 and 26 for releasably fixing the platform means in a given position relative to the frame means, i.e. in the embodiment shown for releasably fixing the components in the position shown in FIGURE 3.

These means are best shown in FIGURES 1 and 5. By reference to the latter of these FIGURES, it will be noted that projecting from the forward face of the frame means 10 are a pair of brackets 80 and 82. Each bracket itself comprises a pair of right angle members 84 and 86 which have their base legs welded to the bar 50, or otherwise suitably attached thereto, and which have their upstanding or forwardly projecting legs disposed in spaced relation to define a slot therebetween.

Extending rearwardly from the bar 36 of the platform means 4 are a pair of coupling arms 90 and 92 so disposed that when the components are in the position shown in FIGURE 3, the arm 90 passes between the upstanding legs of the right angle members 84 and 86 of bracket 80 and the arm 92 passes between the upstanding legs of the right angle members 84', 86' of bracket 82. The cooperating relation between the arms 90 and 92 and the brackets 80 and 82 is most clearly presented in FIGURE 1.

The arms 90 and 92 are provided with apertures 94, and the upstanding legs of the right angle members of each of the brackets is provided with an aperture adapted to register with the aperture 94 when the components are moved to the position shown in FIGURE 3. Thus, when the components have been elevated to traveling position, pins such as that designated by the numeral 100 (FIGURE 5) can be readily slipped through the apertures in each bracket as well as through the aperture 94 in each of the arms 90 and 92. The pins 100 are preferably carried on suitable chains 102, 102' coupled, as by means of the clips 104, 104' to the frame 10 so as to be available for securing the components in place.

In order to effect raising and lowering of the platform means 4, and simultaneous tilting of the frame means 10, the support 20 and jack 22 are provided. The support 20, as best shown in FIGURE 4, comprises a generally U-shaped bar 110 having its spread leg portions 112 attached to the bars 90 and 92 projecting rearwardly of the platform means 4, by any suitable means, such as a weld. Upstanding support bars 114 and 116 extend between the bars 30 and 32 and the upper end of the bar 110 so as to support the same in generally upstanding position whereby the bar 110 and bars 114 and 116 define a generally triangular frame when the elements are disposed in the traveling position as shown in FIGURE 3.

Extending between the connecting block 120 projecting upwardly from the arms 16, and the yoke 124 dispoesd at the top of arm 110, there is provided the jack 22. Such jack generally comprises a turn-buckle having the threaded extensions 136 and 138 projecting from opposite ends of the main housing 140. The lower threaded projection 136 is attached to the connecting block 142 which is adapted to be coupled to the connecting block 120 carried by the arm 16. Preferably a bolt 144 is passed through registered apertures in the connecting block 120 and connecting block 142. The threaded extension 138, as suggested, is coupled with the yoke 124 which fits around the upper end of the bar 110 but is prevented from removal therefrom by means of the cross pin 148 extending between the upstanding legs 125 and 127 of the yoke.

The jack 22 includes a handle 160 which is adapted to rotate about the housing 140, and which carries the ratchet engaging member 164. The housing is provided with the ratchet 166 in peripheral surrounding relation thereto, whereby as the handle is turned in one direction, for example, counterclockwise as shown, the ratchet engaging member 164 engages the teeth of the ratchet 166 thereby turning the housing and causing raising of the platform means and simultaneous tilting of the frame means. The ratchet engaging means 164 is of course provided with a suitable mechanical switching element so that it can operate in either direction, whereby when it is turned, for example, in the clockwise direction as shown, there is a lowering of the platform means relative to the frame means. It will be appreciated by those skilled in the art that any suitable turn-buckle type mechanical jack can be used without departing from the scope and spirit of the invention.

In operation of the device provided hereby, the forward end of the platform means, that is the bracket or attaching device 40 comprising the plates 44, 44' and cross bars 42, 42' is fastened to the tractor, or other motivating device. It is assumed, at this time, that the platform means is supported in the traveling position as shown in FIGURE 3. The device is then moved to the field where an article to be transported is located.

The forward end of the platform means is then lowered by the tractor hydraulic lift, for example, and then detached from the tractor. The pins 100 are then removed from the apertures in which they were formerly placed, and the jack is operated to lower the platform means and thereby simultaneously tilt the frame means. This results in lowering hte platform means onto the ground. The tractor can then pull any article onto the platform means, such as harrows or the like. Once the particular article or implement is loaded, then the user merely operates the jack to raise the platform means whereby it is aligned with the frame means and in traveling position. Thereafter, the pins 100 are inserted through the registering apertures in the arms 90 and 92 and brackets 80 and 82 respectively. Then, the tractor is attached to the forward end of the platform means, or coupling 40, and the transporting device is ready to be pulled over a field or highway or the like at high speeds.

It will be appreciated that only the simplest of mechanical expedients are incorporated, and that operation of the device can be achieved within a minimum of time. There is no need to make or break hydraulic connections, and there is positive coupling of the components in any given traveling position.

Having read the foregoing detailed description of the illustrative and preferred embodiments of the present invention, it should be apparent that the objects set forth at the outset of this specification have been successfully achieved. Various modifications may, however, occur to those of ordinary skill in the art, and accordingly—

What is claimed is:

1. In an apparatus for transporting articles, the combination comprising platform means including a bar extending across the rear end thereof, a pair of ground engaging wheels, wheel frame means defining an axle supported between said wheels, coupling means comprising a plurality of arms fixed to and projecting from said wheel frame means, each of said arms carrying a collar thereon rotatably receiving said bar whereby said platform means lowers to the ground upon tilting of said wheel frame means, an upstanding support frame carried by said platform means, a mechanical jack coupled between the top portion of said upstanding support frame and said wheel frame means for simultaneously lowering and raising said platform means and tilting said wheel frame means, and cooperating means carried by said platform means and said wheel frame means for releaseably fixing said platform means in a given position relative to said wheel frame means.

2. In an apparatus for transporting articles, the combination defined in claim 1 wherein said cooperating means for releaseably fixing said platform means in a given position comprises a pair of spaced brackets carried by said wheel frame means and projecting toward said platform means, a pair of arms carried by said platform means and projecting toward said frame means, said arms extending adjacent said brackets when said platform means is in said given position, said arms and said brackets having apertures therein adapted to register when said platform means is in said given position, and pin means adapted to pass through said registering apertures to maintain said platform means in said given position.

3. In an apparatus for transporting articles, the combination defined in claim 1 wherein said jack comprises a reversable ratchet operated turn-buckle assembly.

References Cited in the file of this patent

UNITED STATES PATENTS

| | | |
|---|---|---|
| 2,227,762 | Ronning | Jan. 7, 1941 |
| 2,515,379 | Paine | July 18, 1950 |
| 2,519,364 | Fredholm | Aug. 22, 1950 |
| 2,614,346 | Howard | Oct. 21, 1952 |
| 2,648,271 | Youngs | Aug. 11, 1958 |
| 2,893,019 | Renfroe et al. | July 7, 1959 |

FOREIGN PATENTS

| | | |
|---|---|---|
| 563,431 | Great Britain | Aug. 15, 1944 |
| 489,840 | Italy | Jan. 29, 1954 |